United States Patent

[11] 3,627,382

| [72] | Inventor | Daniel Lejeune<br>Clermont-Ferrand, France |
|---|---|---|
| [21] | Appl. No. | 887,959 |
| [22] | Filed | Dec. 24, 1969 |
| [45] | Patented | Dec. 14, 1971 |
| [73] | Assignee | Compagnie General Des Etablissements<br>Michelin, raison sociale Michelin & Cie<br>Clermont-Ferrand (Puy-de-Dome), France |
| [32] | Priority | Dec. 24, 1968 |
| [33] | | France |
| [31] | | 180571 |

[54] VEHICLE WHEEL
4 Claims, 2 Drawing Figs.

| [52] | U.S. Cl. | 301/63 R |
|---|---|---|
| [51] | Int. Cl. | B60b 3/04 |
| [50] | Field of Search | 301/63 R,<br>63 D; 29/159.01 |

[56] References Cited
UNITED STATES PATENTS

| 1,597,873 | 8/1926 | Williams | 301/63 |
|---|---|---|---|
| 1,650,780 | 11/1927 | Williams | 301/63 |
| 2,090,254 | 8/1937 | Eksergian | 301/63 |
| 2,406,062 | 8/1946 | Cornell | 301/63 X |
| 2,736,674 | 2/1956 | Harmon | 29/159.01 X |

*Primary Examiner*—Richard J. Johnson
*Attorney*—Brumbaugh, Graves, Donohue & Raymond ABSTRACT: A wheel, for instance a metal wheel, includes a well base rim, also known as a drop center rim, and a disk which has, between the plane of its attachment to the hub and the junction of the disk with the rim, an annular ridge which is pressed out of the disk, the thickness of the disk in the zone of the crest of the ridge being greater than in the adjacent parts of the ridge.

PATENTED DEC 14 1971  3,627,382

INVENTOR.
DANIEL LEJEUNE
BY
Brumbaugh, Graves, Donohue & Raymond
his ATTORNEYS.

VEHICLE WHEEL

BACKGROUND OF THE INVENTION

This invention relates to vehicle wheels and, more particularly, to novel and highly effective wheels for light vehicles in the passenger car and small van category, the wheels having a rim for receiving a pneumatic tire and a disk for attachment of the wheel to a hub means on the vehicle. The disk is connected to the rim for instance by welding.

Generally, the wheel disk has, near its periphery a pressed-out portion forming an annular rib which projects axially from the plane of attachment of the disk to the hub when the wheel is mounted on a vehicle. This is to increase the stiffness of the disk and enable it to resist deformation and fatigue stresses to which the disk is subjected by the application to it of the vehicle load, road shocks and, during cornering, the centrifugal force.

The higher the speed of a vehicle, the greater is the stiffness the disk must have. Of course, it is always possible, when the disk should be made stiffer, to increase the gauge or thickness of the sheet metal from which it is made. But the ensuing increase in weight of the wheel and therefore of the rotating wheel/tire assembly is objectionable. Moreover, the dynamic forces resulting from manufacturing tolerances e.g., defective balance, defective roundness) are increased.

SUMMARY OF THE INVENTION

An object of the invention is to improve the lateral stiffness of the disk of wheels of the above-mentioned type, as well as its resistance to fatigue stresses, without any increase in weight or, at least, with an increase in weight which is less than the increase which would result from uniformly thickening the disk.

The foregoing and other objects are attained in accordance with the invention by the provision of a wheel having a drop center rim and a disk attached to it, the disk having between the plane of its attachment to a hub means and the junction of the disk with the rim an annular ridge which is pressed out of the disk, the thickness of the disk in the crest portion of the ridge being greater than in the adjacent parts of the ridge.

It can also be advantageous for the disk to be locally thickened in the zone adjacent to the plane of attachment to the hub means, such thickening however being at most equal to the thickening in the crest portion of the ridge.

Thus, the thickness of the disk in the crest portion of the annular ridge, and possible also in the zone of the disk adjacent to the plane of attachment of the wheel, is greater than that of the corresponding parts of a conventional wheel of the same size. Thanks to this increased thickness in the crest portion of the ridge, the thickness of the metal in the other parts of the disk can be decreased, thus compensating, at least partially, the increase in weight of the wheel due to the above-mentioned increase or increases. The thickness of the disk at the thickened portion or portions can be from 1.5 to four times that at the portions where the thickness has not been increased or has even been decreased.

According to another feature of the invention, there is advantage for the crest of the ridge to be rounded and for the radius of curvature of the rounded zone at the inside surface of the crest portion to be related to the thickness of metal at the crest. If $e$ is the thickness of metal at the crest and $r$ the radius of curvature, $r : e^2$ should not exceed 1. Also, $r$ should not be greater than the distance by which projects axially outwards from the plane of attachment of the wheel, and not smaller than one quarter of that distance.

A wheel disk in accordance with the invention can be pressed out of a flat disk of nonuniform thickness, or alternatively from a flat disk of originally uniform thickness but to which suitable plates have been attached locally.

BRIEF DESCRIPTION OF THE DRAWING

An understanding of the invention can be gained from a consideration of the following detailed description of a preferred embodiment thereof, in conjunction with the appended figures of the drawing, wherein.

DESCRIPTION OF THE PREFERRED EMBODIMENT

Figure 1:
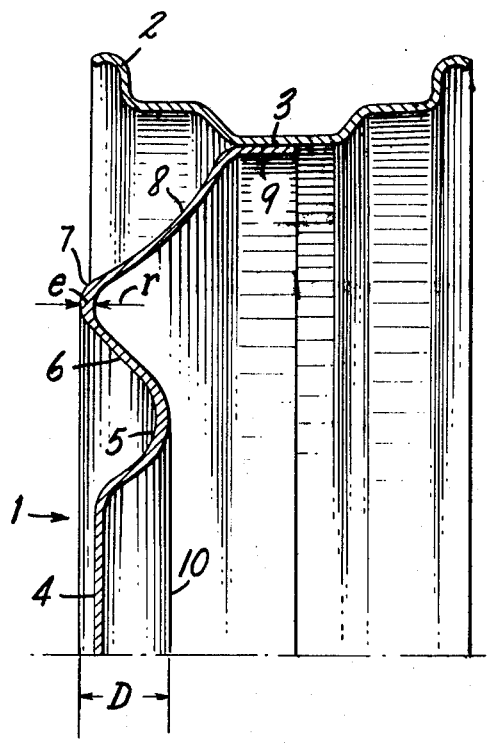
FIG. 1 is a fragmentary view in axial section of a wheel in accordance with the invention.

FIG. 1 shows a wheel disk 1 and a rim 2 which are welded or otherwise connected together by their cylindrical surfaces 3 and 9.

The disk has a central portion 4 of a small thickness which can be as low as 1 mm. Radially outwards there is an inwardly pressed annular ridge 5, 6. The part 5 which is tangential to the plane of attachment 10 of the disk to the hub of the wheel is of increased thickness which can be as high as 5 mm. or as low as 2 mm. The part 6 is less thick than the part 5, its thickness being up to 1.5 mm.

Radially beyond the ridge 5, 6, there is an outwardly pressed ridge 6, 7, 8. The thickness of the part 8 is about the same as that of the part 6 as is that of the cylindrical part 9 of the disk.

The crest of the ridge 6, 7, 8 projects axially beyond the plane of the central part 4 of the disk. The distance between that plane and the plane of attachment is shown as D. It is at the crest that the wheel disk has its maximum thickness $e$. The inside surface of the crest is rounded and, as shown, has a radius of curvature $r$. It is important that a suitable relationship exists between those quantities D, $e$ and $r$. For the best results $r/e^2$      not exceed 1 and $r$     should lie between D and D/4.

Typical dimensions for a 5 J 15 wheel are:

D=38 mm.     r=12 mm.     e=5 mm.

so that $r/e^2$ is about 0.5 mm.$^{-1}$.

The central part 4 which often receives decorative matter is not an essential part of the disk.

Figure 2:
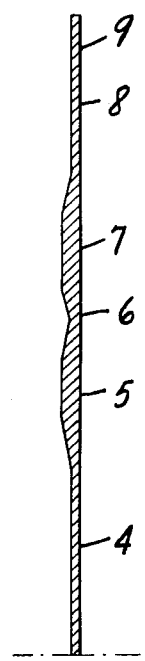
FIG. 2 is a fragmentary view, also in axial section, of a flat disk suitable for being pressed to the shape of the wheel disk shown in FIG. 1.

The flat disk shown in FIG. 1 bears the same references as have been used in FIG. 2 and needs no further explanation.

While the disk in accordance with the invention will normally be made of steel it could be made of any other suitable metallic or nonmetallic material and be either homogenous or heterogeneous in character.

The wheel described above has the advantage of being of lightweight, having substantial lateral rigidity even after long use and of being very resistant to fatigue stresses in the pressed-out zone of the disk.

I claim:

1. A wheel comprising a rim and a disk having an outer peripheral portion connected to the rim, an inner peripheral portion for attachment of the wheel, and, between said outer and inner portions, an annular ridge with a crest and adjacent walls axially outwardly offset from said portions, the thickness of said disk, measured in a direction perpendicular to the surface thereof, being greater in said crest than in the walls of said ridge, the ratio of the thickness of said disk in said crest to the thickness of said walls being between 1.5:1 and 4:1.

2. A Wheel according to claim 1, wherein said inner peripheral portion is plane and is thicker than said walls but at most as thick as said crest.

3. A wheel according to claim 1, wherein said crest has an inner surface which is rounded in cross section with a radius of curvature smaller than the square of thickness of said disk in said crest, when said radius and said thickness are expressed in millimeters.

4. A wheel according to claim 1, wherein said radius of curvature has a length between one time and one-fourth the axial distance between said inner surface and said inner peripheral portion.